United States Patent

[11] 3,577,848

[72] Inventor Robert C. Mengle
 21330 Center Ridge Road, Cleveland, Ohio 44116
[21] Appl. No. 782,087
[22] Filed Dec. 9, 1968
[45] Patented May 11, 1971

[54] METHOD OF EXTRACTING O-RINGS FROM RECESSED GROOVES
6 Claims, 5 Drawing Figs.
[52] U.S. Cl..................................................... 29/427, 29/235, 294/19
[51] Int. Cl...................................................... B23p 19/02
[50] Field of Search............................................ 29/427, 451, 235; 294/19, 24

[56] References Cited
UNITED STATES PATENTS

| | | | |
|---|---|---|---|
| 1,337,398 | 4/1920 | Fleckner | 294/19 |
| 1,964,468 | 6/1934 | Irvine | 29/235 |
| 2,466,952 | 4/1949 | Jakubowski | 29/235 |
| 2,989,334 | 6/1961 | Browne | 294/19 |
| 3,145,463 | 8/1964 | Hockett | 29/451 |
| 3,455,011 | 7/1969 | Harding | 29/451UX |
| 3,473,837 | 10/1969 | Goodman | 294/19 |

FOREIGN PATENTS

| | | | |
|---|---|---|---|
| 541,713 | 12/1941 | Great Britain | 294/19 |
| 543,381 | 2/1942 | Great Britain | 294/19 |

Primary Examiner—Charlie T. Moon
Attorney—Fay, Sharpe and Mulholland

ABSTRACT: A tool for extracting O-rings from grooves which are recessed from the mouth of an opening. It includes an elongated rod with a hook on the forward end and a pivotally attached tongue adjacent the hook, the tongue being adapted to pivot from an open position with the tongue extending transverse to the rod to a closed position which substantially closes the opening in the hook. In open position, the tongue is adapted to slide into the recessed groove adjacent the O-ring; the pivoting to a closed position serves to pry the O-ring out of the groove and grasp the ring between the tongue and the hook.

A method of extracting O-rings from recessed grooves by use of a tool including a rod having a hook and a cooperating pivotable tongue at its forward end. The tongue is opened and the forward end of the rod is inserted into an opening. Within the opening is an O-ring positioned in a groove, the groove being recessed from the mouth of the opening. The tongue is pushed laterally into the groove beside the O-ring and the tool is then retracted toward the mouth of the recess. The retraction serves to close the tongue, pry the O-ring out of the groove and clamp the O-ring between the hook and the tongue.

Patented May 11, 1971
3,577,848
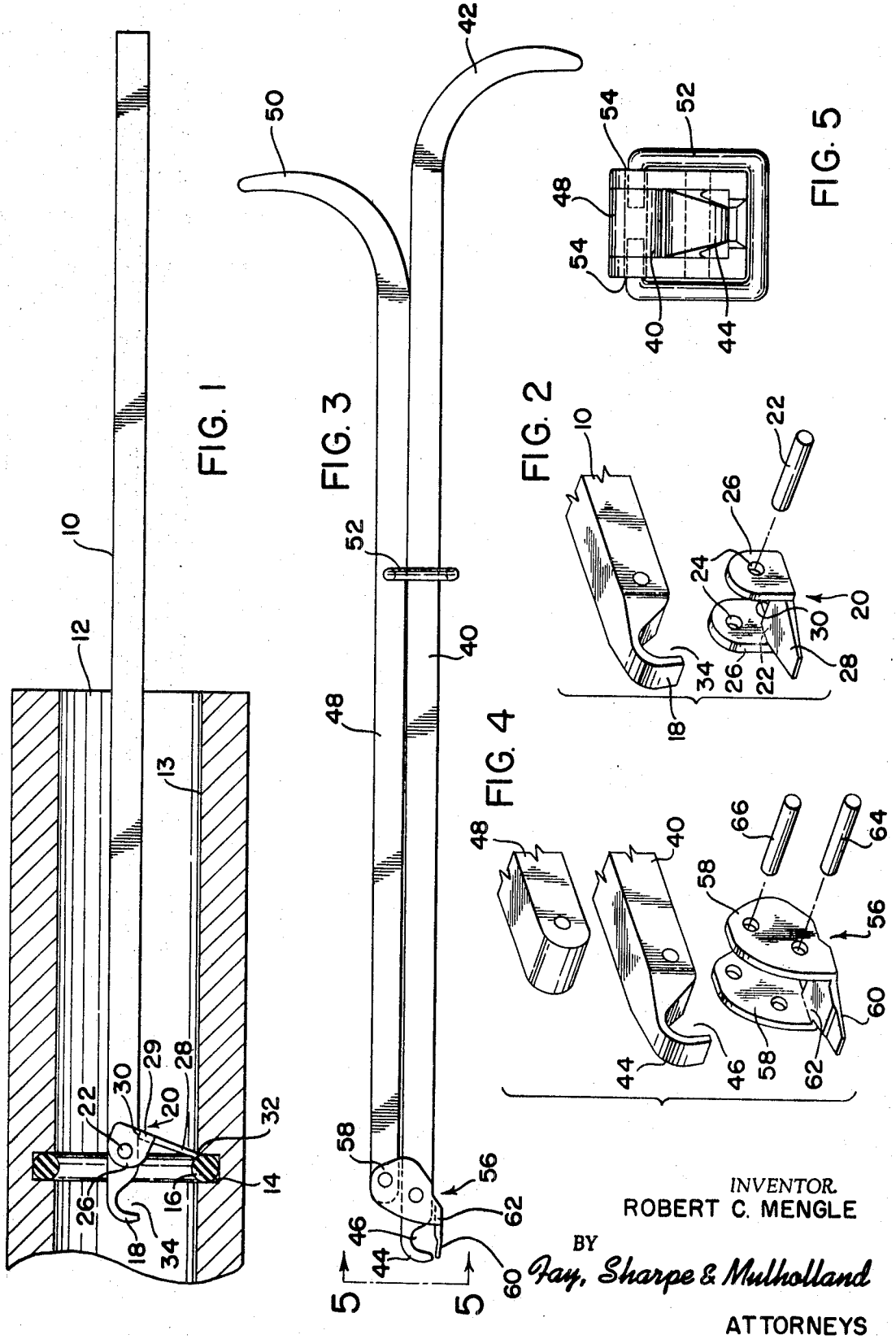
INVENTOR.
ROBERT C. MENGLE
BY
Fay, Sharpe & Mulholland
ATTORNEYS 3,577,848

METHOD OF EXTRACTING O-RINGS FROM RECESSED GROOVES

BACKGROUND OF THE INVENTION

Often machines require fluid seals at locations which are not easily accessible to an assembler or repairman. Conventionally, many such seals are elastomeric O-rings confined in a groove which is recessed from the mouth of a cavity or aperture. Examples are seals in cylinders around a piston where the O-ring acts as a lubricant seal. In the past, to extract such an O-ring from the groove was a very difficult job and ordinarily ice picks, screwdrivers, needle-nosed pliers and other such common tools were used to try to grasp the O-ring. The time wasted on this unproductive work is lost both in terms of man-hours and machine-hours. Thus, the invertor who was aware of the industrial need has conceived of a tool which is simple of design and inexpensive to manufacture to quickly extract O-rings from recessed grooves.

BRIEF DESCRIPTION OF THE INVENTION

Because space is often limited around O-rings in recessed grooves, it is necessary to have a tool which can be manipulated by one hand and includes a long extension for extending into the recess, some transversely extending means which can be used to pry the O-ring out of the groove and some means for firmly grasping the O-ring to pull it out of the recess and prevent it from snapping back into place in the groove once it is pried out at one edge. This the inventor accomplished by providing an elongated rod having a hook on one end facing toward a pivotally attached tongue. The tongue is adapted to pivot open and includes a stop flange or bar for limiting the pivoting to an angle of approximately 90°. The tongue is adapted to pivot toward closed position and thereby pry the O-ring out of the groove at one edge, and upon closing to clamp the O-ring into the recess of the hook. This allows the retraction of the tool from the recess with the O-ring being grasped by the tongue and hook.

BRIEF DESCRIPTION OF THE DRAWINGS

FIG. 1 shows a tool extending into a recess and with a part of the tool projecting into a groove grasping an O-ring.

FIG. 2 is an exploded view of the tongue and the forward end of the rod of FIG. 1.

FIG. 3 is a side elevational view of a modification of the tool of FIG. 1 where two rods are used.

FIG. 4 is an exploded view of the tongue and the forward end of the rods of FIG. 3.

FIG. 5 is an end elevational view of the extractor of FIG. 3.

PREFERRED EMBODIMENT

Referring particularly to FIG. 1, a rod 10 is shown extending into an aperture 12 having sidewalls 13. Within the aperture 10 and recessed from the mouth thereof is a groove 14 containing an O-ring 16. The O-ring shown in the drawing is of rubber or plastic material but the O-ring may be of metal or metal reinforced. On the forward end of the rod 10 is a hook 18, only slightly larger in diameter than the O-ring 16.

A tongue 20 is shown pivotally attached to the forward end of the rod 10 by a pin 22 extending through the rod and through apertures 24 in the side flanges 26 of the tongue.

Noting FIGS. 1 and 2, a probe 28 is integral with a crossbar 29 which connects the flanges 24 and forms a shoulder or stop 30. The shoulder 30 serves to limit the pivoting of the tongue 20 to an angle of approximately 90°.

In operation, the tongue is initially pivoted to an angle of approximately 90° from the axis of the rod 10, as shown in FIG. 1. The forward end of the rod is then extended into the aperture 12 and the probe 28 is then forced into the groove 14 alongside the O-ring 16. To properly function, the probe 28 must be on the side of the groove 14 nearest the mouth of the aperture 12. Next the rod 10 is retracted toward the mouth of the aperture 12 with the rod maintained substantially parallel with the sidewalls 13 of the aperture 12. When this is done, the edge of the groove at 32 acts as a fulcrum for the probe 28. The result is a lever action by the tongue 20, prying the O-ring 16 out of the groove 14 and forcing it into the hook cavity 34. Then with the hook and tongue grasping the O-ring, it may conveniently be pulled out of the groove and cavity for inspection and replacement.

The shoulder 30 is important because the fit between the O-ring 16 and the edge of the groove 14 may be close. To properly insert the probe 28, the operator may have to wiggle the rod 10 back and forth. Without the shoulder 30, the tongue 20 could pivot open to a greater angle than 90°. Obviously, this is undesirable because of the easiest angle of entry between the O-ring and the side of the groove is 90°. Since the operator often cannot see the tongue, he cannot know it has pivoted. The stop 30 allows him to feel the proper alignment.

As is well known in the art, O-rings wear and tend to adhere to the sides of a groove after long periods of use and are much harder to extract than to install. This is true of both elastomeric and metallic O-rings. Thus, while it may be easy to initially install the O-ring 16, it is quite often not easy to retrieve it when it is time to replace it. The unique structure and function of the O-ring extractor shown makes this operation much easier and faster and fills a very important need in the art today.

FIG. 4 illustrates a modification of the O-ring extractor of FIG. 1. It includes a rod 40 similar to the rod 10 with the exception that on its rear end it contains a transverse extension 42 shaped to fit the finger of an operator to facilitate manual manipulation of the tool. A forward end of the rod 40 includes a hook 44 similar to the hook 18 on rod 10 and including a cavity 46 similar to the cavity 34. Above, and extending parallel to the rod 40 is another rod 48 with a similar curved transverse extension 50 to be used with the transverse extension 42 of rod 40. A U-shaped wire clip 52 circumscribes rod 40 and is crimped into apertures 54 in rod 48 to hold the rods 40 and 48 substantially in parallel alignment.

The tongue 56 is similar to the tongue 20 in that it includes side flanges 58 and a tapering probe 60. A bar 62 extends across the space between the flanges 58 and the probe 60 is integral with the bar 62. The bar 62 serves the same function as shoulder 30 of tongue 20 in that it limits the angle of pivot of the tongue 56 to an angle of approximately 90°. A pin 64 extends through the flanges 58 and through an aperture in rod 40 to serve as a pivot point for the tongue 56. In addition, a pin 66 extends through an aperture in the forward end of rod 48 and the flanges 58 to also pivot the tongue from the rod 48.

In operation, the O-ring extractor of FIG. 4 is extended into a recess and when the forward portion of the extractor is in position, the operator presses forward against the rear extension 50 to move it forward relative to the rod 40 and the tongue pivots to its open position with the probe 60 extending downward at an angle of approximately 90°. The probe 60 is then forced into the groove alongside the O-ring. When the probe bottoms in the groove, the rod 48 is pulled rearwardly by the transverse extension 50 while the rod 40 is held firmly in place. In this instance, the probe 60 will scoop the O-ring out of the groove and clamp it into the cavity 46 of the hook 44. Then together the two rods 40 and 48 are retracted from the cavity with the hook and tongue grasping the O-ring.

A modification of the connection between the tongue 20 and the rod 10 may be made without departing from the spirit of the invention. The tongue may include only one central flange 26 which is suspended between two side flanges of the rod 10. This is merely a reversal of the meshing parts of the tongue and the rod. Similar structure could easily be incorporated into the extractor of FIG. 3.

Obvious modifications will occur to those having ordinary skill in the art, such as putting a hook and tongue combination on the forward end of each of the rods 40 and 48, and it is not intended that the language used to describe the invention nor the drawings illustrating the preferred embodiments be limiting on the invention. Rather it is intended that the invention be limited only by the appended claims.

I claim:

1. A method of extracting O-rings from recessed grooves comprising:

inserting a tool into a recess, the tool having a hook and a pivotally attached tongue at one end, the recess including a groove containing an O-ring remote from the mouth of the recess;

pivoting the tongue to a position such that it may be inserted into the groove;

inserting the tongue into the groove beside the O-ring; and retracting the tool from the recess with the O-ring grasped between the hook and the tongue.

2. The method of claim 1 wherein prior to retracting the tool from the recess, an edge of the groove is used as a pivot point and the tool retracted toward the mouth of the recess to pivot the tongue toward the hook, thereby prying a portion of the O-ring out of the groove.

3. The method of claim 1 wherein prior to retracting the tool from the recess and after inserting the tongue into the groove, pivoting the tongue toward the hook to pry a portion of the O-ring out of the groove.

4. The method of claim 3 wherein the tongue is pivotally connected to two parallely aligned rods and the tongue is pivoted toward the hook by movement of one rod relative to the other.

5. The method of claim 4 wherein said movement comprises a retraction of one rod in a direction substantially parallel to its axis.

6. The method of claim 5 including mechanically locking the rods in parallel relationship at a point remote from the hook.